(12) United States Patent
Mikolajewski et al.

(10) Patent No.: US 10,639,967 B2
(45) Date of Patent: May 5, 2020

(54) AIR-OUTLET ADJUSTING ASSEMBLY

(71) Applicants: Dr. Ing. h.c. F. Porsche Aktiengesellschaft, Stuttgart (DE); Dr. Schneider Kunststoffwerke GmbH, Kronach-Neuses (DE)

(72) Inventors: Sergej Mikolajewski, Remseck (DE); Bernd Gayer, Weissach (DE); Norman Lange, Leonberg (DE); Johannes Schneider, Kueps (DE)

(73) Assignees: DR. ING. H.C. F. PORSCHE AKTIENGESELLSCHAFT, Stuttgart (DE); DR. SCHNEIDER KUNSTSTOFFWERKE GMBH, Kronach-Neuses (DE)

( * ) Notice: Subject to any disclaimer, the term of this patent is extended or adjusted under 35 U.S.C. 154(b) by 307 days.

(21) Appl. No.: 15/666,587

(22) Filed: Aug. 2, 2017

(65) Prior Publication Data

US 2018/0037090 A1    Feb. 8, 2018

(30) Foreign Application Priority Data

Aug. 4, 2016  (DE) .................. 10 2016 114 411

(51) Int. Cl.
  *B60H 1/34*    (2006.01)
  *F16H 27/00*   (2006.01)
  *F16H 27/06*   (2006.01)

(52) U.S. Cl.
  CPC .............. *B60H 1/34* (2013.01); *B60H 1/3421* (2013.01); *F16H 27/06* (2013.01); *B60H 2001/3478* (2013.01); *F16H 27/00* (2013.01)

(58) Field of Classification Search
  CPC ........ B60H 1/34; B60H 1/248; B60H 1/3421; B60H 2001/3478; F16H 27/00; F16H 27/04; F16H 27/06
  (Continued)

(56) References Cited

U.S. PATENT DOCUMENTS 5,052,282 A * 10/1991 Scharamm ......... B60H 1/00857
                                                     237/12.3 A
5,169,121 A * 12/1992 Blanco ................ F24F 13/1426
                                                            200/47

(Continued)

FOREIGN PATENT DOCUMENTS

CN    101181868 A    5/2008
CN    104417314 A    3/2015

(Continued)

*Primary Examiner* — Gregory L Huson
*Assistant Examiner* — Frances F. Hamilton
(74) *Attorney, Agent, or Firm* — Leydig, Voit & Mayer Ltd.

(57) ABSTRACT

An air-outlet adjusting assembly for a motor vehicle includes a drive unit configured to be driven by an electric drive and configured to act on at least one pivotable valve flap and at least one pivotable guide slat. The drive unit includes a rotatably arranged sliding-block carrier having a sliding block arranged eccentrically thereon, wherein, in a first rotary motion segment of the sliding-block carrier, the sliding block is configured to engage in a valve-flap slotted link connected for conjoint rotation to the at least one valve flap and, in a second rotary motion segment of the sliding-block carrier, the sliding block is configured to engage in a guide-slat slotted link connected for conjoint rotation to the at least one guide slat.

8 Claims, 2 Drawing Sheets

(58) Field of Classification Search
USPC .................. 454/162, 155; 74/112, 113, 436
See application file for complete search history.

(56) References Cited

U.S. PATENT DOCUMENTS

| | | | | |
|---|---|---|---|---|
| 5,903,114 | A * | 5/1999 | Miller | B60S 1/16 15/250.22 |
| 6,131,336 | A * | 10/2000 | Krause | B60H 1/3414 49/74.1 |
| 6,761,214 | B2 * | 7/2004 | Kuribayashi | B60H 1/00842 165/202 |
| 6,791,289 | B1 * | 9/2004 | Long | F16H 27/06 318/443 |
| 7,267,139 | B2 * | 9/2007 | Blomquist | F02D 9/1065 137/607 |
| 9,878,596 | B2 * | 1/2018 | Ross | B60H 1/34 |
| 9,927,044 | B2 * | 3/2018 | Kezar | F16H 19/001 |
| 10,081,225 | B2 | 9/2018 | Kang et al. | |
| 2004/0219874 | A1 * | 11/2004 | Karadia | B60H 1/3421 454/155 |
| 2012/0184197 | A1 | 7/2012 | Mayer | |
| 2014/0120823 | A1 * | 5/2014 | Brinas | B60H 1/34 454/155 |
| 2017/0176044 | A1 * | 6/2017 | Kezar | F16H 19/001 |

FOREIGN PATENT DOCUMENTS

| | | | | |
|---|---|---|---|---|
| CN | 105691144 | A | 6/2016 | |
| DE | 8126754 | U1 | 7/1987 | |
| DE | 9208225 | U1 | 10/1993 | |
| DE | 102009003816 | B3 | 6/2010 | |
| DE | 102010008377 | A1 | 8/2011 | |
| DE | 102015112571 | B3 | 7/2016 | |
| DE | 102015112571 | B3 * | 7/2016 | ........... B60H 1/3421 |
| DE | 102015112572 | B3 * | 7/2016 | ........... B60H 1/3421 |
| EP | 0888916 | A2 | 1/1999 | |
| EP | 1223062 | A1 | 7/2002 | |
| EP | 1520738 | A1 | 4/2005 | |
| JP | 2001138727 | A | 5/2001 | |
| JP | 2013212821 | A | 10/2013 | |
| RU | 2251492 | C1 | 5/2005 | |
| RU | 2582628 | C2 | 4/2016 | |

* cited by examiner

AIR-OUTLET ADJUSTING ASSEMBLY

CROSS REFERENCE TO RELATED APPLICATIONS

This application claims benefit to German Patent Application No. DE 10 2016 114 411.8, filed Aug. 4, 2016, which is hereby incorporated by reference herein.

FIELD

The invention relates to an air-outlet adjusting assembly for a motor vehicle.

BACKGROUND

In the automotive engineering sector, air outlets are used for the air conditioning of the motor vehicle interior and are known in many different embodiments. The air outlets generally comprise an air outlet housing, in which adjustable air flaps are arranged. In this case, the air flaps are embodied as valve flaps or guide slats, wherein the volume flow can be set by means of the valve flaps, and the direction of the air flow emerging from the air outlet can be set by means of the guide slats.

The air flaps are usually adjusted by means of an adjusting assembly, which engages on the air flaps and which can be actuated manually by the vehicle occupant or electrically by an electric drive. EP 1 520 738 discloses an adjusting assembly for an air outlet embodied as a gear mechanism, for example. The adjusting assembly has an input gearwheel, which is driven by an electric drive and which, in a first motion segment, is operatively connected to an output gearwheel connected to guide slats and, in a second motion segment, is operatively connected to an output gearwheel connected to valve flaps. The valve flaps and guide slats are adjusted by rotation of the input gearwheel. In a central position, neither of the two output gearwheels is operatively connected to the input gearwheel. Starting from the central position and depending on the direction of rotation of the input gearwheel, the first or the second motion segment is traversed and, in the process, either the valve flaps or the guide slats are adjusted. If the teeth of the output gearwheels are not in engagement with the teeth of the input gearwheel, the relevant output gearwheel is fixed by means of a guide element formed on the face of the input gearwheel so as to block rotation, wherein the output gearwheels each have a counter guide element adjoining the faces thereof, said counter guide element interacting in each case with the guide element.

A problematic aspect of an air-outlet adjusting assembly of this kind for a motor vehicle is that the adjusting assembly is complex and expensive to produce owing to the complex configuration of the input gearwheel and of the two output gearwheels.

SUMMARY

In an embodiment, the present invention provides an air-outlet adjusting assembly for a motor vehicle. The air-outlet adjusting assembly includes a drive unit configured to be driven by an electric drive and configured to act on at least one pivotable valve flap and at least one pivotable guide slat. The drive unit includes a rotatably arranged sliding-block carrier having a sliding block arranged eccentrically thereon, wherein, in a first rotary motion segment of the sliding-block carrier, the sliding block is configured to engage in a valve-flap slotted link connected for conjoint rotation to the at least one valve flap and, in a second rotary motion segment of the sliding-block carrier, the sliding block is configured to engage in a guide-slat slotted link connected for conjoint rotation to the at least one guide slat.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
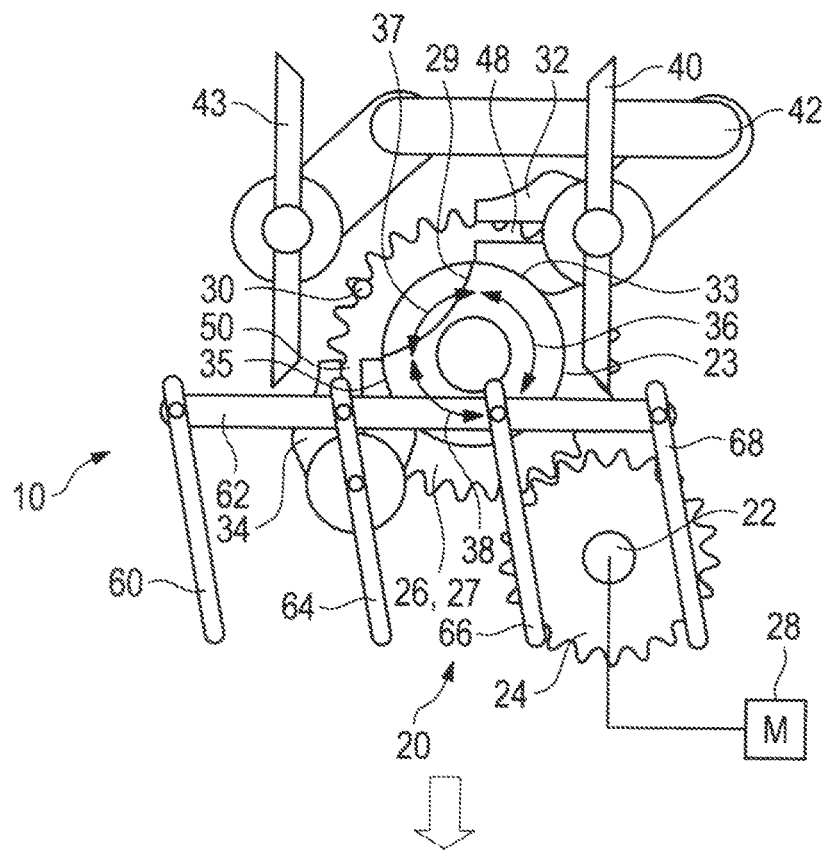
FIG. 1 shows a schematic plan view of an air outlet adjusting device.

An air-outlet adjusting assembly for a motor vehicle is described herein which can be produced in a simple and inexpensive manner.

An air-outlet adjusting assembly described herein has a drive unit, which is driven by an electric drive and which interacts with at least one valve flap and at least one guide slat.

According to an embodiment of the invention, the drive unit is composed of a valve-flap slotted link, a guide-slat slotted link, a sliding block and a sliding-block carrier, wherein the sliding-block carrier has at least one first rotary motion segment and one second rotary motion segment. Here, the length and position of the rotary motion segments relative to one another can be defined according to requirements.

The sliding-block carrier can be of disk-shaped design and driven directly by an electric drive, for example. As an alternative, the sliding-block carrier can form the output gearwheel of a gear mechanism, of a belt drive or of a chain drive.

The sliding block can be arranged eccentrically on the face of the disk-shaped sliding-block carrier, wherein the sliding block can be a pin, which is secured on the sliding-block carrier by means of a screwed, adhesively bonded or welded joint. Owing to the eccentric arrangement of the sliding block on the sliding-block carrier and the rotation of the sliding-block carrier, the sliding block moves on a circular path and, depending on which rotary motion segment of the sliding-block carrier is traversed, engages in the valve-flap slotted link or the guide-slat slotted link.

The valve-flap slotted link and the guide-slat slotted link can be connected indirectly or directly to the valve flap and the guide slat respectively. The valve-flap slotted link and the guide-slat slotted link each have a slot or a groove, the open ends of which are aligned in such a way relative to the circular path of the sliding block that the sliding block moving on the circular path thereof can engage in the slot or in the groove in the valve-flap slotted link or the guide-slat slotted link.

During operation, engagement of the sliding block in the valve-flap slotted link or in the guide-slat slotted link depends on which rotary motion segment of the sliding-block carrier is being traversed. In the first rotary motion segment, the sliding block engages in the valve-flap slotted link and rotates the valve-flap slotted link and the valve flap connected thereto in a continuously variable manner between an open position and a closed position. Rotation of the guide slat is accomplished in the same way while the second rotary motion segment of the sliding-block carrier is being traversed and the sliding block is in engagement in the guide-slat slotted link.

A configuration of the adjusting assembly described herein can be provided in a simple and inexpensive manner since the individual components of the adjusting assembly are simple to produce. Here, the adjusting assembly does not have any gearwheels, which would have to be produced in a complex and expensive process.

In a preferred embodiment, the first and the second rotary motion segments do not overlap, and therefore either the valve flaps or the guide slats are adjusted as the respective rotary motion segments are traversed. In this way, the air-flap slotted link can be configured independently of the guide-slat slotted link, thereby making production and configuration of the slotted links easier.

The drive unit is preferably embodied as a mechanism. The drive unit is, for example, a single-stage spur gear mechanism and has an input gearwheel and an output gearwheel, wherein the input gearwheel is driven by the electric drive via an input shaft and the output gearwheel serves as a sliding-block carrier. By virtue of the mechanism, a commercially available electric motor can be used as the electric drive, wherein the relatively slow speed of rotation of the valve flaps and of the guide slats can be set by means of the chosen transmission ratio.

The valve-flap slotted link and the guide-slat slotted link each preferably have a slot, in which the sliding block can engage in each case. As an alternative, the valve-flap slotted link and the guide-slat slotted link could each have a groove, in which the sliding block can engage. In this way, the slotted link can be produced in a simple and inexpensive manner. Here, the slot or groove can have any desired shape, thereby making it possible to influence the rotation of the valve flaps and/or guide slats dynamically.

In a preferred embodiment, the sliding-block carrier has a guide element which extends axially from a face of the sliding-block carrier and, with the circumferential surface, acts as a guide for the valve-flap slotted link and the guide-slat slotted link when the sliding block is not in engagement. The valve-flap slotted link and the guide-slat slotted link each have a counter guide element, which interacts with the guide element. In this way, the rotation of the valve flap and the guide slat can be blocked, even when the sliding block is not in engagement with the valve-flap slotted link or the guide-slat slotted link.

The axis of rotation of the valve flap is preferably aligned parallel to the axis of rotation of the guide slat. As a result, the drive unit can be embodied in a simple manner and with a small number of components since the drive unit engages on the valve-flap slotted link and the guide-slat slotted link in a common plane and no redirection of the force into a different plane is required. Alternatively, the axis of rotation of the valve flap is aligned perpendicularly to the axis of rotation of the guide slat.

The valve flap is preferably arranged upstream of the guide slat, thereby ensuring that the air outlet design that is visible to the vehicle occupant remains virtually unchanged during the various positions of the valve flap and of the guide slat.

In a preferred embodiment, a plurality of valve flaps are connected to one another by a valve-flap connecting element, and/or a plurality of guide slats are connected to one another by a guide-slat connecting element. Here, a plurality of guide slats is advantageous, in particular, allowing better guidance of the air flow emerging from the air outlet. The valve-flap slotted link is connected for conjoint rotation to a valve flap and is connected to further valve flaps by the valve-flap connecting elements, ensuring that all the valve flaps are rotated jointly and synchronously by the rotation of the valve-flap slotted link. In the same way, a guide slat is connected for conjoint rotation to the guide-slat slotted link and, by the guide-slat connecting element, to further guide slats, wherein all the guide slats are rotated jointly by the rotation of the guide-slat slotted link.

FIG. 1 shows a schematic view of an air-outlet adjusting assembly 10 having a drive unit 20, which is embodied as a mechanism. The drive unit 20 has an input gearwheel 24, which is connected for conjoint rotation to an input shaft 22 driven by an electric drive. The input gearwheel 24 engages in an output gearwheel 27 and drives the output gearwheel 27.

A sliding block 30 is arranged eccentrically on one face of the output gearwheel 27, and therefore the output gearwheel 27 serves as a sliding-block carrier 26. In relation to the sliding block 30, the output gearwheel 27 has a first rotary motion segment 36, a second rotary motion segment 38 and a central rotary motion segment 37, wherein the sliding block 30 engages in a valve-flap slotted link 32 in the first rotary motion segment 36, in a guide-slat slotted link 34 in the second rotary motion segment 38, and engages neither in the valve-flap slotted link 32 nor in the guide-slat slotted link 34 in the central rotary motion segment 37.

The valve-flap slotted link 32 is connected to a valve flap 40 and, by means of a valve-flap connecting element 42, to a second valve flap 43, with the result that both valve flaps 40, 43 are rotated by the rotation of the valve-flap slotted link 32.

The guide-slat slotted link 34 is connected to a guide slat 64 and, by means of a guide-slat connecting element 62, to three further guide slats 60, 66, 68, thereby ensuring that the guide slats 60, 62, 66, 68 are rotated jointly and synchronously by the rotation of the guide-slat slotted link 34.

The valve-flap slotted link 32 and the guide-slat slotted link 34 each have a counter guide element 33, 35, which slides on a guide element 23 formed on the output gearwheel 27 when the sliding block 30 is not in engagement in the valve-flap slotted link 32 or in the guide-slat slotted link 34. In this way, the rotation of the valve-flap slotted link 32 is blocked when the sliding block 30 is in engagement with the guide-slat slotted link 34. When the sliding block 30 is in engagement in the valve-flap slotted link 32, the counter guide element 33 does not rest on the guide element 23, wherein the guide element 23 has a recess 29 to ensure that the rotation of the valve-flap slotted link 32 is not blocked by the guide element 23.

FIG. 1 shows a position of the sliding-block carrier 26 in the central rotary motion segment 37, wherein the sliding block 30 is in engagement neither in the valve-flap slotted link 32 nor in the guide-slat slotted link 34. During the central rotary motion segment 37, the counter guide elements 33, 35 rest on the guide element 23, thereby ensuring that the valve-flap slotted link 32 and the guide-slat slotted link 34 are fixed by the guide element 23 to block rotation and the valve flaps 40, 43 and the guide slats 60, 64, 66, 68 are aligned in the direction of the air flow. In the figures, the direction of the air flow is illustrated as a contoured arrow.

Figure 2:
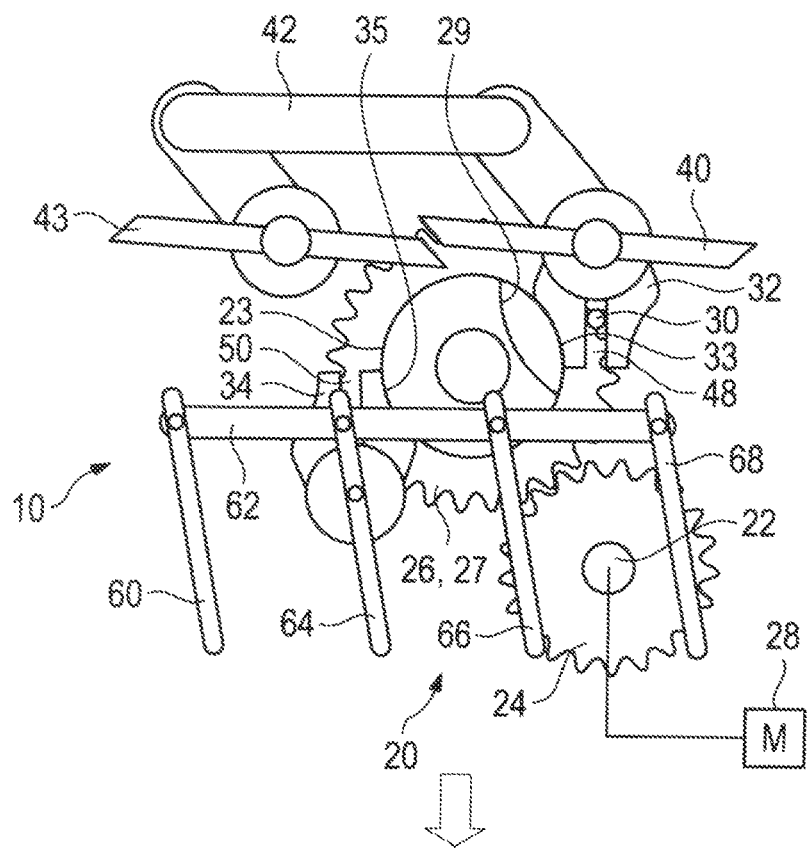
FIG. 2 shows an illustration of the air outlet adjusting device illustrated in FIG. 1, in a first position.

In FIG. 2, the sliding block 30 is in engagement in a slot 48 formed in the valve-flap slotted link 32, wherein the valve flaps 40, 43 are illustrated in a transverse or closed position, which is obtained after the first rotary motion segment 36 of the sliding-block carrier has been traversed. Here, the free flow cross section of the air outlet decreases with increasing movement of the sliding block 30 in the slot 48, until the air outlet is completely closed at the end of the rotary motion segment.

Figure 3:
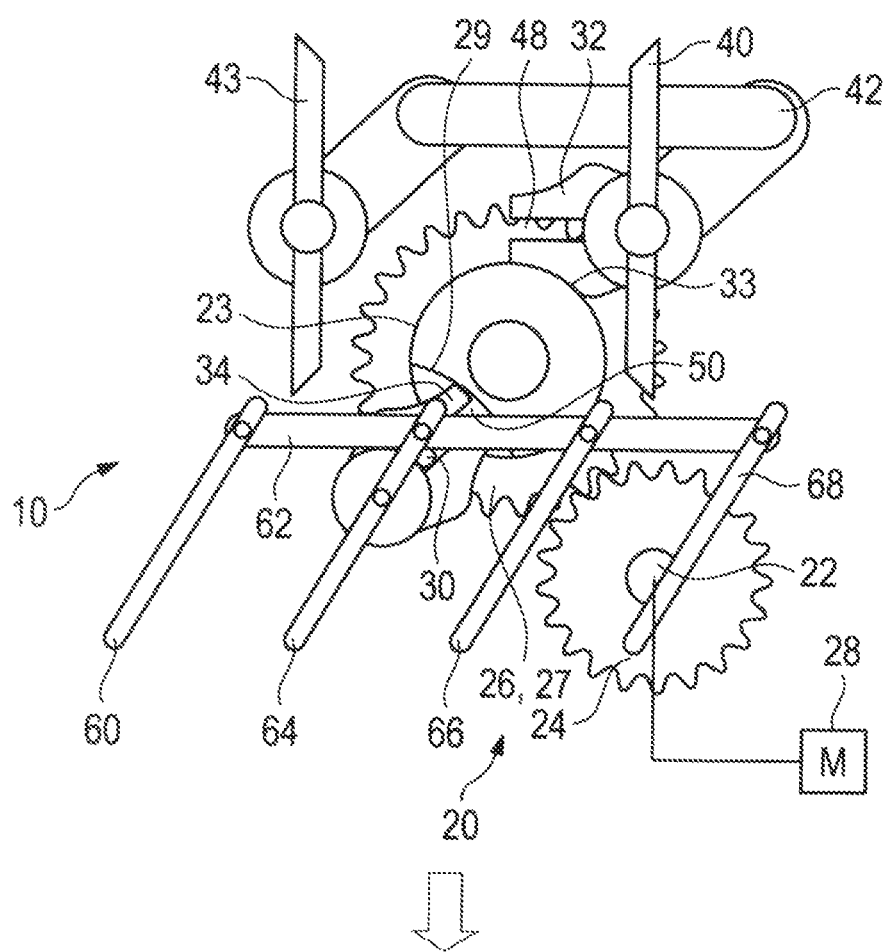
FIG. 3 shows an illustration of the air outlet adjusting device illustrated in FIG. 1, in a second position.

FIG. 3 shows the traversing of the second rotary motion segment 38 and the engagement of the sliding block 30 in the guide-slat slotted link 34. For this purpose, the guide-slat slotted link 34 has a slot 50, in which the sliding block 30 slides and the guide-slat slotted link 34 rotates. By means of the rotation of the guide-slat slotted links, the guide slats 60, 64, 66, 68 are rotated synchronously. In this way, it is possible to set the direction of the air flow, wherein intermediate positions in the second rotary motion segment 38 can also be set by means of the electric drive.

Other design embodiments than the embodiments described are also possible, falling within the scope of protection of the main claim. For example, the drive unit 20 or the valve-flap slotted link 32 and/or the guide-slat slotted link 34 can be embodied differently.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An air-outlet adjusting assembly for a motor vehicle, the air-outlet adjusting assembly comprising:
    a drive unit configured to be driven by an electric drive and configured to act on at least one pivotable valve flap and at least one pivotable guide slat,
    wherein the drive unit includes a rotatably arranged sliding-block carrier having a sliding block arranged eccentrically thereon, wherein, in a first rotary motion segment of the sliding-block carrier, the sliding block is configured to engage in a valve-flap slotted link connected for conjoint rotation to the at least one valve flap and, in a second rotary motion segment of the sliding-block carrier, the sliding block is configured to engage in a guide-slat slotted link connected for conjoint rotation to the at least one guide slat.

2. The air-outlet adjusting assembly as claimed in claim 1, wherein the first rotary motion segment of the sliding-block carrier and the second rotary motion segment of the sliding-block carrier do not overlap.

3. The air-outlet adjusting assembly as claimed in claim 1, wherein the drive unit is embodied as a mechanism having an input gearwheel and an output gearwheel, wherein the output gearwheel forms the sliding-block carrier and the input gearwheel is connected for conjoint rotation to the electric drive by an input shaft.

4. The air-outlet adjusting assembly as claimed in claim 1, wherein the valve-flap slotted link and the guide-slat slotted link each have a slot, in which the sliding block engages.

5. The air-outlet adjusting assembly as claimed in claim 1, wherein the sliding-block carrier has a slotted guide element, which is configured to interact with a counter guide element of the valve-flap slotted link and with a counter guide element of the guide-slat slotted link to block rotation.

6. The air-outlet adjusting assembly as claimed in claim 1, wherein an axis of rotation of the at least one valve flap and an axis of rotation of the at least one guide slat are aligned parallel to one another.

7. The air-outlet adjusting assembly as claimed in claim 1, wherein the at least one valve flap is arranged upstream of the at least one guide slat.

8. The air-outlet adjusting assembly as claimed in claim 1, wherein in each case a plurality of valve flaps are connected to one another by a valve-flap connecting element, and/or a plurality of guide slats are connected to one another by a guide-slat connecting element, wherein the valve-flap slotted link is connected for conjoint rotation to a valve flap, and the guide-slat slotted link is connected for conjoint rotation to a guide slat.

* * * * *